(No Model.)
J. BARKER.
COMBINED ROTARY HARROW AND STALK CUTTER OR ROLLER.
No. 273,009. Patented Feb. 27, 1883.
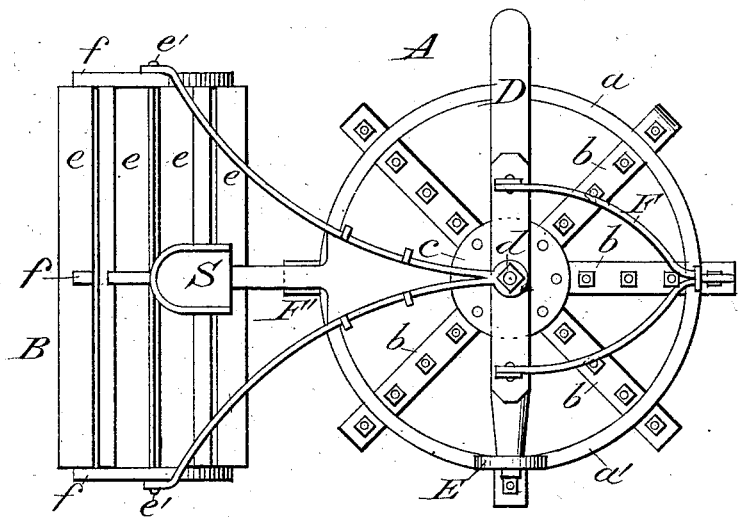
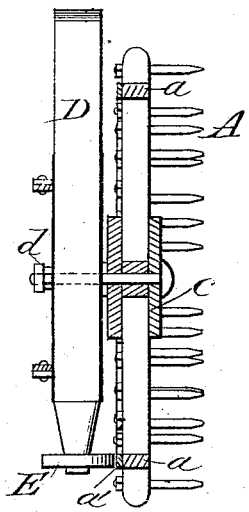
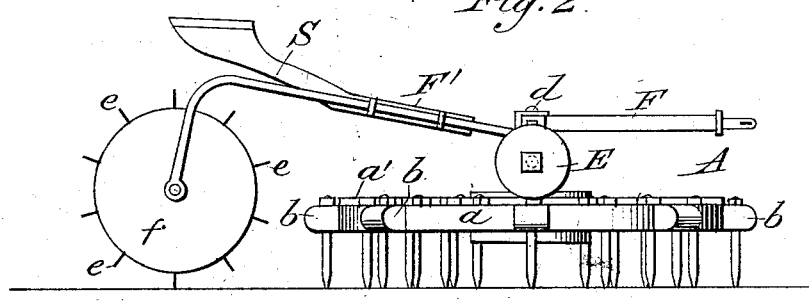
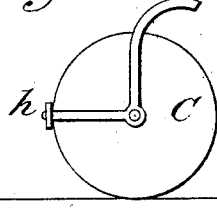
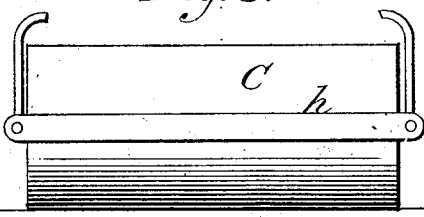
Attest:
H. H. Schott
Jno. A. Stockman
Inventor:
James Barker
J. C. Tasker
atty
N. PETERS. Photo-Lithographer, Washington, D. C.

UNITED STATES PATENT OFFICE.

JAMES BARKER, OF EMORY, TEXAS.

COMBINED ROTARY HARROW AND STALK-CUTTER OR ROLLER.

SPECIFICATION forming part of Letters Patent No. 273,009, dated February 27, 1883.

Application filed June 7, 1882. (No model.)

*To all whom it may concern:*

Be it known that I, JAMES BARKER, a citizen of the United States of America, residing at Emory, in the county of Rains and State of Texas, have invented certain new and useful Improvements in Rotary Harrows and Stalk-Cutters or Rollers, of which the following is a specification.

My invention relates to a combined rotary harrow and stalk-cutter or roller.

The object of my invention is to provide a rotary harrow, to be used in combination with a stalk-cutter or roller, for the purpose of harrowing ground and at the same time cutting off the stalks of the preceding crop, or for harrowing in and rolling seed.

My invention consists in a combination and arrangement of parts, as hereinafter fully described and pointed out, reference being had to the accompanying drawings, in which Figure 1 is a plan view of my rotary harrow combined with a stalk-cutter. Figs. 2 and 3 are respectively a side and a partial sectional elevation of the same. Figs. 4 and 5 are detailed views of the roller.

Similar letters refer to similar parts throughout the several views.

In the said drawings, A represents the harrow, B the stalk-cutter, and C the roller.

The harrow A is made in a circular form, with a rim, $a$, connected to a center hub, $c$, by arms $b$. Through the center hub, $c$, extends a king-bolt, $d$, which projects through a beam, D, on one end of which is journaled a metal wheel, E, which runs on the rim $a$ of the harrow, on the top of which is a metal track, $a'$.

F is the draft-rod, which is bifurcated, and hinged to the beam D on each side of the king-bolt $d$ in such a manner that the wheel E may be turned to either side of the harrow, allowing the harrow to rotate in either direction.

The stalk-cutter B consists of a number of steel blades, $e$, set in heads $f$, of cast-iron or other suitable material, and connected to the harrow A at the center by the bifurcated reach F', which is attached at each end to the journals $e'$ $e'$ of the stalk-cutter B. S is the seat, which is secured in the fork of the bifurcated reach F'.

The roller C is made of a plain round stick of timber having suitable journals, and provided with a knife or scraper, $h$, which keeps the roller clean and prevents clogging. For seeding, or when desired for other purposes, the roller C may be substituted for the stalk-cutter and connected to the harrow by the bifurcated reach F'.

The horses are attached in the ordinary manner to the draft-bar F. The harrow, while drawn forward, is allowed to rotate by reason of the metal wheel E, and thus prevents any damage from striking stumps or stones. The stalk-cutter B cuts up the stalks of the preceding crops, so that they may be readily turned under in plowing, where they will soon decay and enrich the ground. The harrow is very strong, the arms and rim being plated on top with iron.

Having thus described my invention, what I claim as new, and desire to secure by Letters Patent, is—

1. The combination of the rotary harrow A, consisting of the ring $a$, having track $a'$, radial toothed arms $b$, recessed hub $c$, cross-beam D, having wheel E and king-bolt $d$, and the bifurcated draft-bar F, with the revolving stalk-cutter B, consisting of the heads $f$, having knives $e$ and journals $e'$, and the bifurcated reach F', having the seat S attached between its forks, substantially as shown and described.

2. The combination, with the rotary harrow A, having cross-bar D provided with wheel E, king-bolt $d$, and bifurcated draft-bar F, of the revolving stalk-cutter B, consisting of the heads $f$, having bearings $e'$ and knives $e$, and the bifurcated reach F', having seat S attached between its forks, substantially as set forth.

In testimony whereof I affix my signature in presence of two witnesses.

JAMES BARKER.

Witnesses:
T. B. HAYS,
H. W. MARTIN.